(12) United States Patent
Pearce

(10) Patent No.: US 9,842,311 B2
(45) Date of Patent: Dec. 12, 2017

(54) MULTIPLE USERS WORKING COLLABORATIVE ON A SINGLE, TOUCH-SENSITIVE "TABLE TOP"DISPLAY

(75) Inventor: Nigel Pearce, Lancashire (GB)

(73) Assignee: Promethean Limited (GB)

(*) Notice: Subject to any disclaimer, the term of this patent is extended or adjusted under 35 U.S.C. 154(b) by 0 days.

(21) Appl. No.: 13/348,923

(22) Filed: Jan. 12, 2012

(65) Prior Publication Data

US 2012/0284636 A1    Nov. 8, 2012

(30) Foreign Application Priority Data

Jan. 12, 2011   (GB) .................................. 1100507.1

(51) Int. Cl.
*G06Q 10/10* (2012.01)
*G06F 3/0482* (2013.01)

(52) U.S. Cl.
CPC ........... *G06Q 10/10* (2013.01); *G06F 3/0482* (2013.01)

(58) Field of Classification Search
CPC .............................. G06F 3/0482; G06Q 10/10
USPC ........................................................ 715/751
See application file for complete search history.

(56) References Cited

U.S. PATENT DOCUMENTS

| 5,008,853 | A * | 4/1991 | Bly et al. ....................... 715/751 |
| 5,659,547 | A * | 8/1997 | Scarr et al. ..................... 714/4.4 |
| 2004/0046784 | A1* | 3/2004 | Shen et al. ..................... 345/733 |
| 2005/0108396 | A1 | 5/2005 | Bittner |
| 2005/0183035 | A1* | 8/2005 | Ringel et al. .................. 715/811 |
| 2006/0053380 | A1* | 3/2006 | Spataro ............. G06F 17/30011 715/753 |
| 2007/0112799 | A1 | 5/2007 | Bales et al. |
| 2007/0124370 | A1 | 5/2007 | Nareddy et al. |
| 2008/0076501 | A1* | 3/2008 | Mares et al. .................... 463/13 |
| 2008/0192059 | A1 | 8/2008 | Kennedy |
| 2009/0094561 | A1 | 4/2009 | Do et al. |
| 2010/0083109 | A1 | 4/2010 | Tse et al. |
| 2011/0161824 | A1* | 6/2011 | Coldefy ................ G06F 3/0481 715/735 |

FOREIGN PATENT DOCUMENTS

| EP | 1852768 | 11/2007 |
| GB | 2469757 | 10/2010 |
| WO | 2005107154 | 11/2005 |

OTHER PUBLICATIONS

Extended Search Report for European Patent Application No. 12150797.4, dated Jul. 9, 2012, 7 pages.
Search Report prepared by the Great Britain Intellectual Property Office on May 13, 2011, for Great Britain Application No. GB 1100507.1.

* cited by examiner

*Primary Examiner* — Jennifer To
*Assistant Examiner* — Ashley Fortino
(74) *Attorney, Agent, or Firm* — Brient Globerman, LLC; Kyle M. Globerman

(57) ABSTRACT

There is disclosed a method of providing resources in a collaborative input system comprising an interactive display surface, the method comprising: providing a common set of resources for a plurality of users; and selectively providing the common set of resources to individual users.

14 Claims, 7 Drawing Sheets

MULTIPLE USERS WORKING COLLABORATIVE ON A SINGLE, TOUCH-SENSITIVE "TABLE TOP" DISPLAY

BACKGROUND TO THE INVENTION

Field of the Invention

The present invention relates to the provision of user interface resources in a collaborative input system in which the user interface is controlled via a plurality of inputs. The invention is particularly, but not exclusively, concerned with an interactive display system, such as a system incorporating a touch sensitive interactive surface, which in use may be presented in a horizontal or vertical arrangement, and is particularly but not exclusively concerned with such surfaces being provided with touch inputs from a plurality of different sources.

Description of the Related Art

Interactive surfaces which are adapted to detect touch inputs are well-known in the art. Such an interactive surface may be arranged to have a display to display graphical information and/or images to a user. A user is able to touch the surface at a position at which an object is displayed in order to select the object, or move the touch contact across the surface in order to move the object. Similarly a touch contact may be used to draw or annotate on the display of the touch surface.

Various applications for such touch sensitive surfaces are well-known in the art, such as in handheld electronic devices such as mobile phones or personal data assistants (PDAs). On a larger scale, such touch surfaces are also known as part of interactive display systems, such as electronic whiteboards. More recently, touch sensitive display surfaces have been shown as being used for interactive tables, where the display surface is disposed in a horizontal plane as a table surface.

It is also known in the art of touch sensitive display surfaces to include such surfaces in a collaborative input system, to allow for multiple users to interact with the touch sensitive display simultaneously. In practice multiple inputs can be received from a single user, as well as from a plurality of users. The interactive touch sensitive surface is adapted to be responsive to touch inputs in general, and thus is responsive to a plurality of touch inputs.

One problem with systems in which multiple inputs are received from multiple users is allocating resources to users using a common application.

Software applications that expose a graphical user interface (GUI) are designed to be interacted with via a single input source, such as a mouse input. When a user has to select one tool from a range of mutually exclusive tools on a toolbar, it is therefore sufficient to show one of the tools in a highlighted or selected state within the GUI, with all other tools being shown in a non-highlighted or non-selected state.

It is also known in the art for computer systems to receive inputs from multiple input sources. For example a keyboard and a mouse may be considered as two separate input sources. In more sophisticated systems, multiple mouse devices may be provided, each mouse device constituting a separate input source.

Moreover, in the field of interactive systems having interactive display surfaces, particularly such interactive systems incorporated within systems such as electronic whiteboards, it has been proposed to allow for the processing of multiple detected inputs at the interactive surface. In a more recent development, it is proposed to allow for the detection of multiple inputs at an interactive surface, which inputs are detected using different types of input detection technology. It is known in the art to provide interactive surfaces which are touch-sensitive, and to provide interactive surfaces which are adapted to detect the presence of a specially adapted pen (such as by electromagnetic means). In a proposal for an interactive surface in an electronic whiteboard application, the interactive surface is adapted to detect touch inputs and pen inputs. Each input type may be considered a distinct input source.

In the proposals for an interactive surface of an interactive display system it is further proposed for each input type, i.e. pen or touch, to be able to select a different tool within an application running on the computer system.

Moreover, it is desirable that even different input sources of the same type may be able to select different tools and control an application in different ways. For example an interactive system may be able to distinguish between inputs from two different pens, based on different operating frequencies of the pens.

In order to address this problem, it has been proposed by Promethean Limited to provide each identifiable pen with a toolbox specific to that pen. Thus the tool currently associated with a specific pen is highlighted within a pen-specific toolbox.

Whilst this solution has particular advantages in certain applications, it requires software applications configured for single-input applications to be specially adapted, and also means that less of the display area is available for use by the software application, the presence of multiple toolboxes for each input source consuming the usable display area. For this reason, in certain applications it would be advantageous to maintain a shared toolbox for multiple input sources, rather than provide each input source with a separate toolbox.

A problem then arises in the prior art, in that known GUIs are implemented with toolbars which are adapted to allow selection and highlighting of one tool at a time. When utilised in a multi-input environment, a shared toolbox allows only for the same function to be allocated to all inputs. When one input is used to select a function in the shared toolbox, all inputs then have that function. Thus a function must be selected (or reselected) each time an input is used, to ensure a desired functionality is always associated with the input when it is used.

In another solution Promethean Limited have provided an improvement in a computer system associated with a display for receiving control inputs from a plurality of input sources, and adapted to display a shared control panel for the plurality of input sources, the shared control panel being associated with an application running on the computer system.

It is an aim of the invention to provide an improvement in a collaborative input system in which each of a plurality of inputs, preferably at an interactive surface, is able to select one or more tools displayed on a user interface.

It is an aim to provide an improvement in a collaborative input system in which a user interface is controlled via a plurality of inputs, preferably at an interactive surface.

SUMMARY OF THE INVENTION

There is provided a method of providing resources in a collaborative input system comprising an interactive display surface, the method comprising: providing a common set of resources for a plurality of users; and selectively providing the common set of resources to individual users.

The step of selectively providing the common set of resources to individual users may comprise providing individual users with a sub-set of said common set of resources.

The sub-set of common resources provided to a user may be in dependence upon the user needs. For example, the sub-set of common resources provided may be determined in dependence on a specific action currently being undertaken by a user, or a specific application currently being used by a user. Thus if a user is manipulating geometric shapes, the resources made available to the user are those associated with manipulating and generating geometric shapes. In this way, the resources provided to a user are specific to the current use, and the resources made available or displayed to the user are limited to usable resources for the current use or application.

At least one of the resources available to each of the plurality of users may be adjusted in dependence on selection of a resource by one of the plurality of users.

The method may further comprise displaying an icon representing a resource on the display, wherein if the resource is selected by a user an identification of that user is displayed with said icon.

A computer program is provided, when run on a computer, to perform any defined method.

A computer program product is provided for storing computer program code which, when run on a computer, performs any defined method.

There is provided a collaborative input system comprising an interactive display surface, and adapted to: provide a common set of resources for a plurality of users; and selectively provide the common set of resources to individual users.

Selectively providing the common set of resources to individual users may comprise adapting the system to provide individual users with a sub-set of said common set of resources.

The sub-set of common resources provided to a user may be in dependence upon the user needs.

At least one of the resources available to each of the plurality of users may be adjusted in dependence on selection of a resource by one of the plurality of users.

The collaborative input system may be further adapted to display an icon representing a resource on the display, wherein if the resource is selected by a user an identification of that user is displayed with said icon.

There is also provided a collaborative input system comprising an interactive display surface, and further comprising: means for providing a common set of resources for a plurality of users; and means for selectively providing the common set of resources to individual users.

BRIEF DESCRIPTION OF THE FIGURES

The invention will now be described by way of example with reference to the accompanying figures, in which.

DESCRIPTION OF THE PREFERRED EMBODIMENTS

The invention is now described by way of reference to various examples, embodiments, and advantageous applications. One skilled in the art will appreciate that the invention is not limited to the details of any described example, embodiment or detail. In particular the invention may be described with reference to exemplary interactive display systems. One skilled in the art will appreciate that the principles of the invention are not limited to any such described systems.

The invention is described herein with reference to a touch sensitive interactive display surface for collaborative working. The invention is not limited to touch-sensitive surfaces. The invention is particularly described in the context of such a surface provided as a horizontal—or 'table-top'—surface, but is not limited to such a specific user arrangement.

The invention is not limited to any particular type of touch sensitive technology, nor to any particular type of display technology. In examples, the display of the touch sensitive surface may be provided by a projector projecting images onto the touch sensitive surface. In other examples the display may be provided by the touch sensitive surface being an emissive surface. Various other options exist as will be understood by one skilled in the art. In general the surface 100 is described herein as a touch sensitive surface, which may have images projected thereon (e.g. by a projector) or which may also be an emissive display surface.

Figure 1:
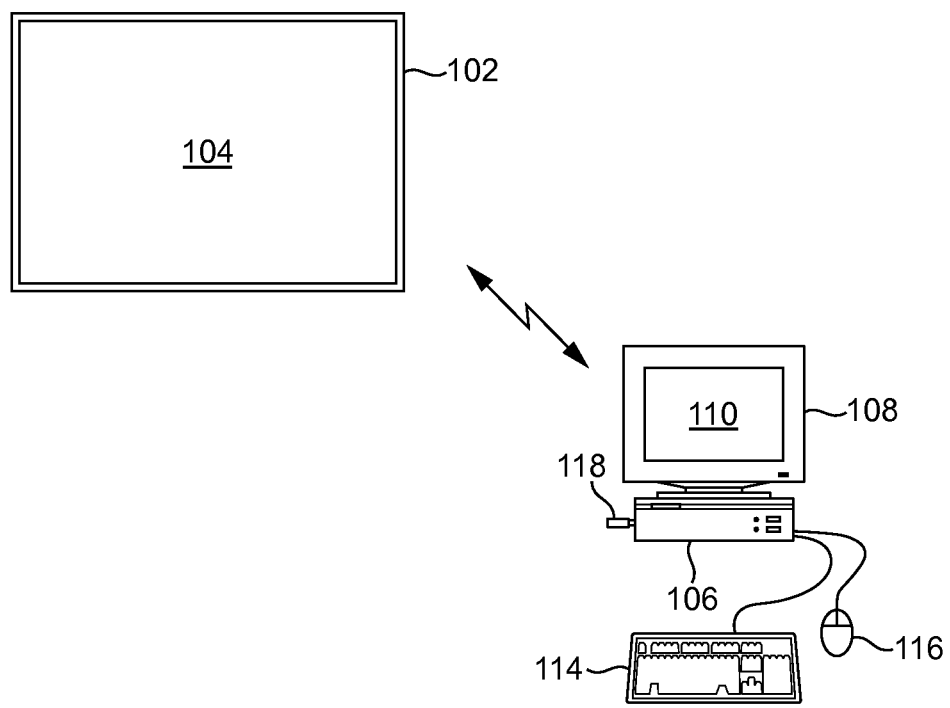
FIG. 1 illustrates an exemplary collaborative input system.

With reference to FIG. 1, there is illustrated an exemplary environment in which the invention and its embodiments may be implemented. FIG. 1 illustrates an interactive display system. The interactive display system includes an electronic whiteboard 102 having an interactive display surface 104; a computer 106 having a monitor 108 with a display 110, and an associated keyboard 114 and an associated mouse 119; and a system hub 118.

As known in the art, the electronic whiteboard 102 including the interactive display surface 104 is arranged such that images are displayed on the interactive display surface 104. The interactive display surface may be an emissive surface, or images may be displayed by means of a projection system (not shown). As also known in the art, the electronic whiteboard is arranged such that inputs on the interactive display surface 104, for example provided by a finger or pointing devices such as a pen, may be detected. The coordinates of such inputs can be determined to allow the finger or pointing device to manipulate the displayed images in the same way as a computer mouse may manipulate the images.

As known in the art the computer 106 runs computer software associated with applications which control the display of images on the interactive display surface 104, and which applications are controlled by the inputs detected at the interactive display surface 104. The computer system controls the display of images to the interactive display surface 104, for example by providing video signals to a projector or directly to an emissive surface, and manipulates the displayed images based on received signals representing the detected inputs at the interactive display surface.

Preferably the computer 106 and the electronic whiteboard 102 are provided with wireless communication means, such that data associated with detected input at the interactive display surface 104 are transmitted wirelessly to the computer 106. The computer may be connected wirelessly to drive the display of images to the interactive display surface, or for example a projector may be connected to the computer via a wire connection.

Preferably the computer 106 is provided with the communication hub 118 which provides for the wireless communication of the computer with the whiteboard. The communication hub 118 provides the wireless transceiver technology to allow for wireless communication, and runs firmware which enables the appropriate communication with the whiteboard.

The interactive display system may be used as a conventional computer system, with the electronic whiteboard providing a display and input device for controlling a conventional computer software application.

The invention is also not limited in it's applicability to a user interface displayed on an interactive display surface. For example the invention may also be advantageously implemented in a computer system which receives inputs only from peripheral devices such as a computer mouse of computer keyboard, or digitiser. However the invention is described herein in the context of an embodiment relating to an interactive display surface, as such an implementation is particularly improved by the application of the invention. Similarly the invention is not limited in its applicability to any particular type of interactive display surface. The invention may, for example, be advantageously implemented in a system incorporating an interactive display system which incorporates an electromagnetic surface and detects inputs at the surface associated with pen-type devices. However the invention is described herein in an embodiment which utilises a touch-sensitive interactive display surface.

With reference to FIGS. 2(a) to 2(e) there is illustrated an exemplary registration or initialisation for a touch sensitive interactive display surface of an interactive display surface adapted for use by multiple users, and further adapted to allow association of an input anywhere on the touch sensitive surface with a particular user, in which exemplary environment the invention may be advantageously implemented.

As illustrated in FIG. 2(a), there is provided a plurality of displayed tokens denoted by reference numerals 202a to 202f generally disposed on and around a displayed ring 200. A circular icon 204 is displayed within the centre of the ring, which as will be described further hereinbelow gives an indication of the user registration/initialisation process.

In the arrangement of FIG. 2(a), the tokens 202a to 202f do not have any association defined therewith, and are available for selection. One skilled in the art will appreciate that such tokens may be displayed on the display surface in any position.

The circular and central user icon 204 is displayed showing a neutral "face", indicating that user initialisation/registration has not been completed, and therefore an application associated with the selection of tokens cannot be proceeded with.

As denoted in FIG. 2(b), two users select respective ones of the tokens 202a to 202f. A first user selects the token 202a, and drags the token generally to the right-hand edge (as shown in the Figures) of the display surface. A second user selects the token 202b, and drags the token to the bottom edge (as illustrated in the Figures) of the display.

As illustrated in FIG. 2(b), once the token 202b is dragged to the edge of the display, and preferably appropriately orientated and positioned relative to the edge, an additional icon 206b is displayed adjacent the token 202b, and an additional set of icons 212b are displayed adjacent the token 202b.

The displayed icon 206b is a "traffic light" icon, having two "lights" for display thereon only one of which may be set at any one time. A position 208b denotes a red light, and a position 210b denotes a green light. Whilst the user selection of an identity associated with the token 202b is underway, the traffic light 206b displays a red light 208b.

Once the user is satisfied that they have completed their registration, then on touching the displayed icon 206b the displayed light changes from the red light 208b to the green light 210b, meaning that the user has completed their user registration.

Similarly the token 202a is associated with a traffic light 206a, having a red light 208a and a green light 210a, which is controlled in the same manner as the traffic light 206b.

Figure 2:
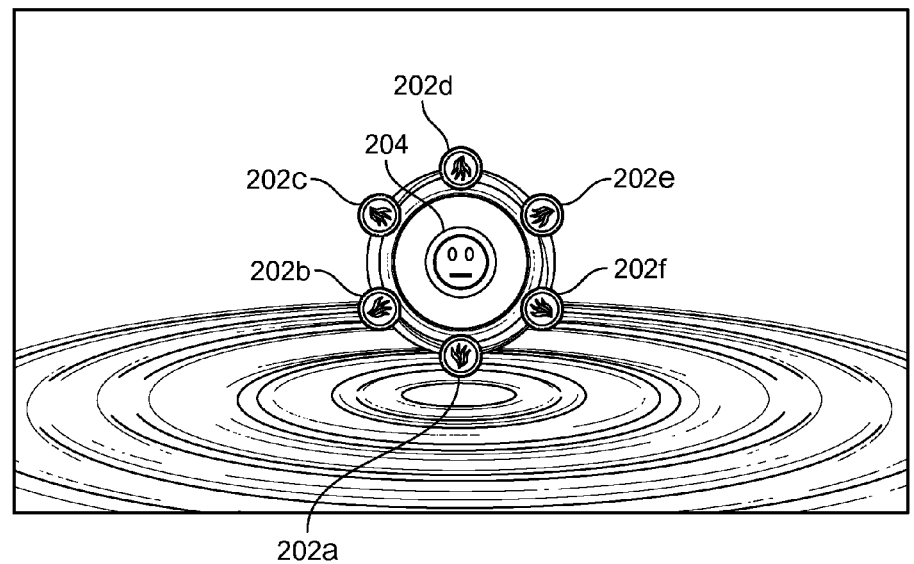
FIGS. 2(a) to 2(e) illustrate allocation of identities to users in an exemplary implementation scenario of the invention.
Figure 2:
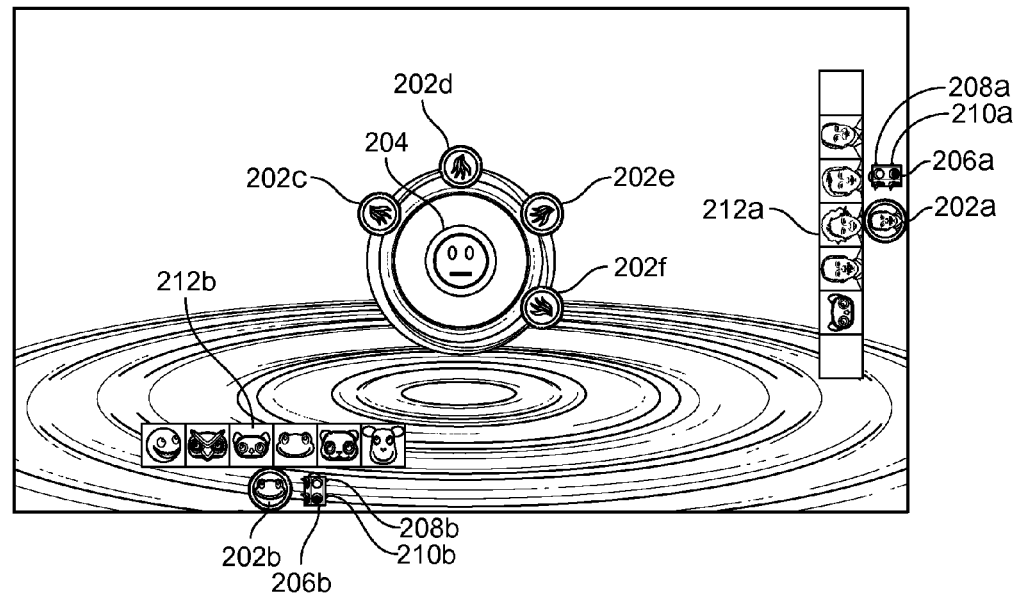
Figure 2:
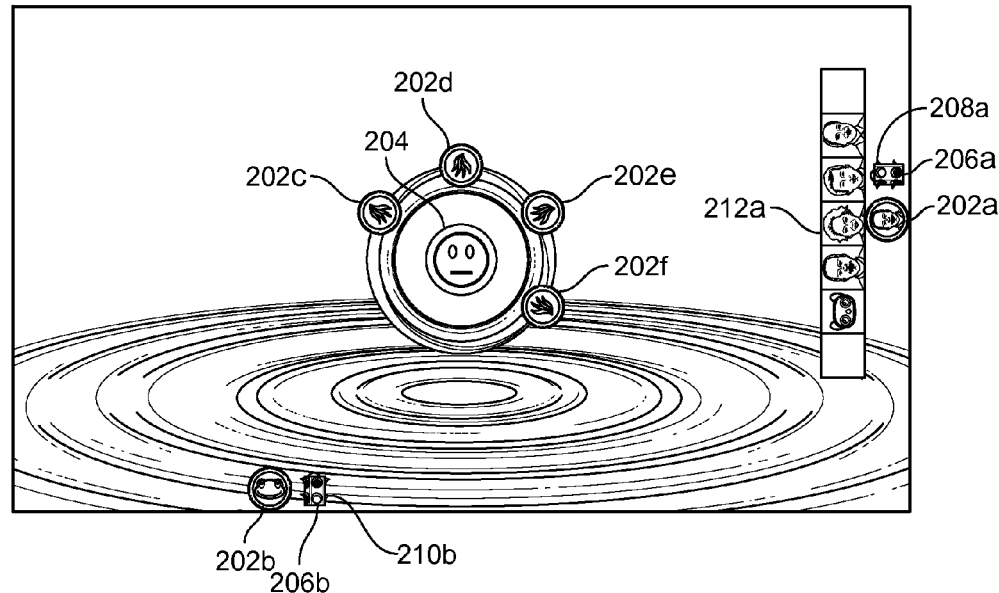
Figure 2:
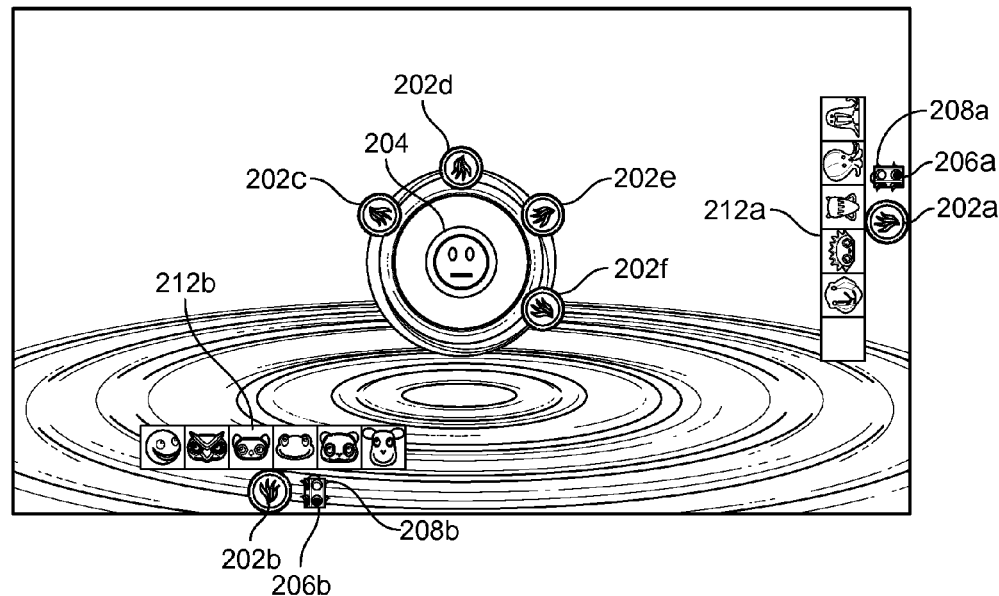
Figure 2:
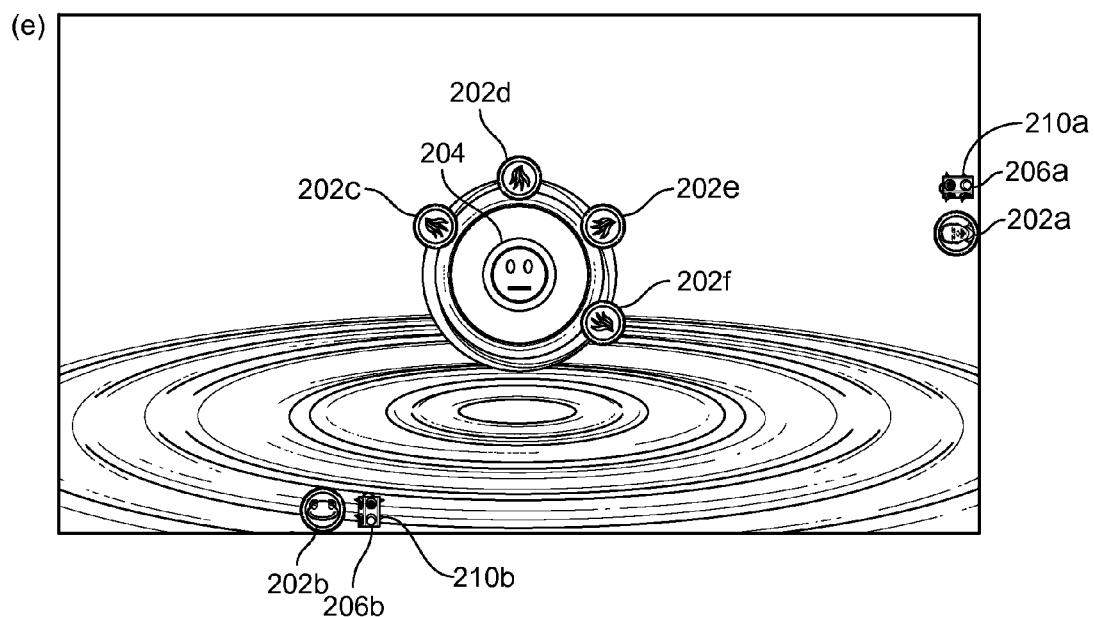

As illustrated further in FIG. 2(b), the set of displayed icons 212b includes a plurality of avatars. As illustrated, the plurality of avatars include, for example, a panda, a frog, a cat, and an owl. The user may scroll through the available avatars by moving their finger left to right on the set of icons 212b, such that more avatars may be available for display than those illustrated in FIG. 2, only a small number being displayed at any one time so as to avoid consuming too much display space on the surface. The user then may select an avatar by touching the avatar with their finger, such that that avatar then appears in the centre of their token 202b. Thus, as illustrated in FIG. 2(b), the user has selected the frog avatar, such that an avatar representing the frog is displayed on the token 202b. In this way, the user may identify themselves anonymously, but in such a way as a unique identity is associated therewith.

As further illustrated in FIG. 2(b), the user associated with the token 202a similarly has displayed a set of user icons 212a, which as illustrated in FIG. 2(b) include the display of photographs of individuals. The user can select the photograph of an individual which represents themselves, and then the appropriate displayed photograph is displayed in the centre of the token 202a. The user may similarly scroll left to right amongst the set of displayed icons 212a, and the photographs of users—which may be registered users of the system—may be displayed as well as avatars and other options for defining an association of the token.

As illustrated in FIG. 2(b), each of the users has selected a displayed icon from their respective sets 212b and 212a, but the traffic light 206b and 206a for each of the users is set at red as denoted by a light in positions 208b and 208a.

As illustrated in FIG. 2(c), the first user completes selection of their user icon, by touching the traffic light icon 206b such that the displayed light turns to the green light in position 210b. The selection options 212b are then no longer displayed, and the selected option displayed in the token 202b, which as illustrated is the avatar of a frog. At the same time, the second user maintains the traffic light 206a in the red light position as denoted by the light in position 208a.

It will be noted that throughout the process of FIGS. 2(b) and 2(c), the displayed "face" of the icon 204 in the centre of the screen is maintained in a neutral position.

With respect to FIG. 2(d), the first user touches the icon 206b again in order to revert their status to incomplete, denoting that a user identification is being selected. Thus the traffic light displayed is the red light in position 208b, and the selection icons 212b are again displayed. As noted in FIG. 9(d) the token 202b is then adjusted such that no user identification is displayed therewith. Similarly for the second user associated with token 202a, the displayed set of icons 212a are altered to show avatars, as the user has scrolled left or right in order to display further options. The user of the traffic light 206a is maintained with the red light in position 208a displayed. The displayed icon 204 is maintained with the "face" in a neutral display.

With regard to FIG. 2(e), there is then illustrated the case where the first user has selected a desired user identity, as denoted by the green traffic light in position 210b of the traffic light 206b. As denoted in FIG. 2(e), this is the selection of a frog avatar in the token 202b. Further the second user associated with token 202a selects the traffic light 206a in order to change the displayed traffic light to the green light in position 210a.

As both users have now indicated that they have completed selection of a user identification, then the display of the icon 204 is changed to a positive display, in this case a happy face, in order to indicate that all tokens have been associated with users and the users have indicated completion of such selection. As such the initialisation/registration process is complete, and one or more applications may be run.

With reference to FIGS. 3(a) to 3(e) there is now illustrated an example operation of the use of an application, on selection of user identities as described with reference to FIGS. 2(a) to 2(e), in accordance with an embodiment of the invention.

FIGS. 3(a) to 3(e) show the user interface of a drawing application being run on the interactive display surface, and for which users associated with the tokens 202b and 202a may provide inputs. There is illustrated a number of lines displayed on the display surface. As illustrated, each of the tokens 202a and 202b is associated with a respective display tool menu 220a and 220b. As illustrated, various tools may be displayed in the menu, but only a subset of the available tools may be displayed at any one time. Thus the user may see additional tools for selection by scrolling the menus 220a and 220b left to right. As illustrated, for example, the available tools may include a ruler and a protractor. A user selects a tool by touching on the displayed icon for the tool which they desire, in their respective menu 220a and 220b.

The tools are provided from a common tool menu or library. That is, a single tool menu or library is provided for the application, and all users are able to select tools from that common menu or library. Thus each of the individual display tool menus 220a and 220b represent a display of tools available in a common tool menu or library.

Figure 3:
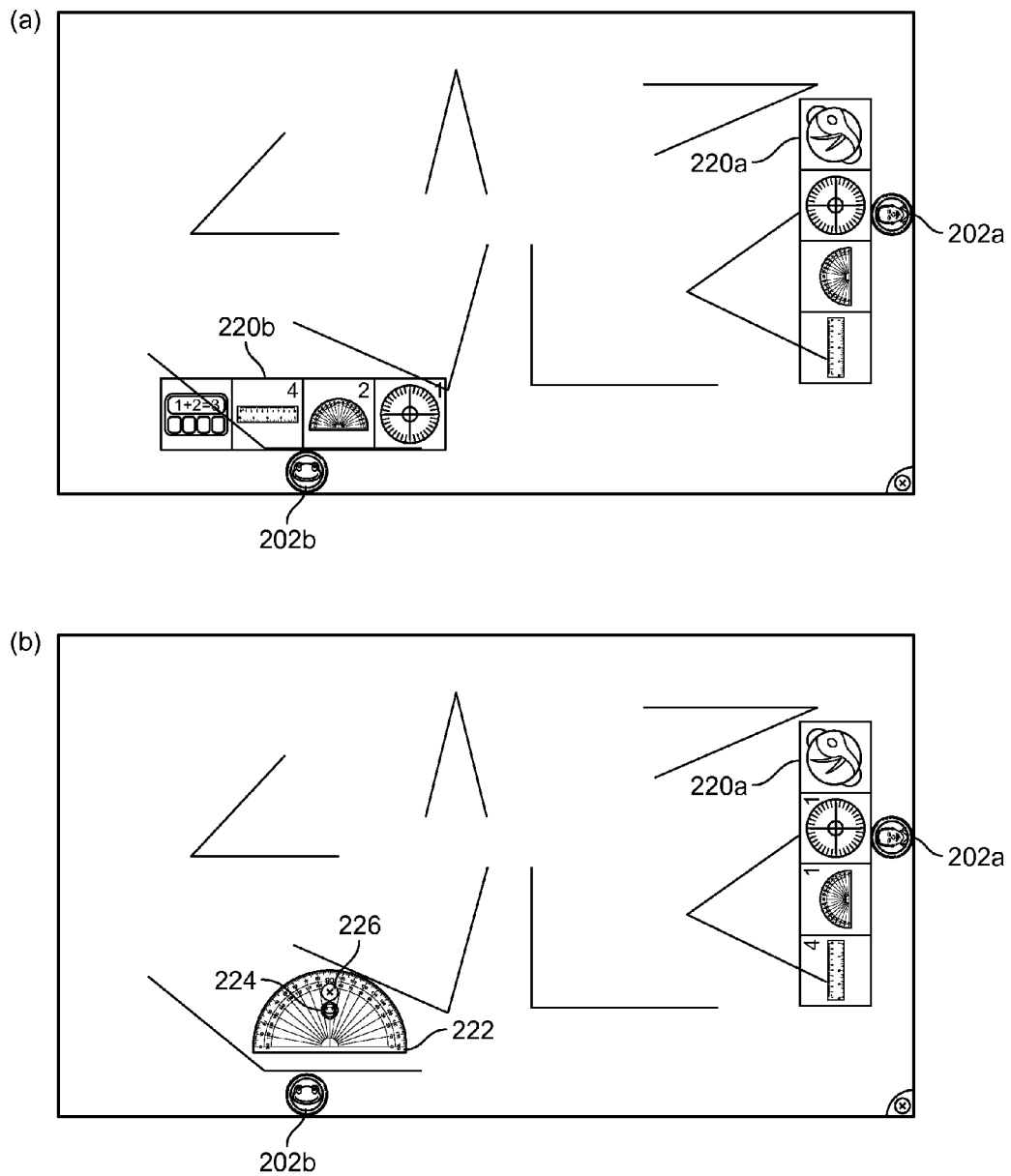
FIGS. 3(a) to 3(e) illustrate the selection and allocation of tools in accordance with an exemplary embodiment of the invention.
Figure 3:
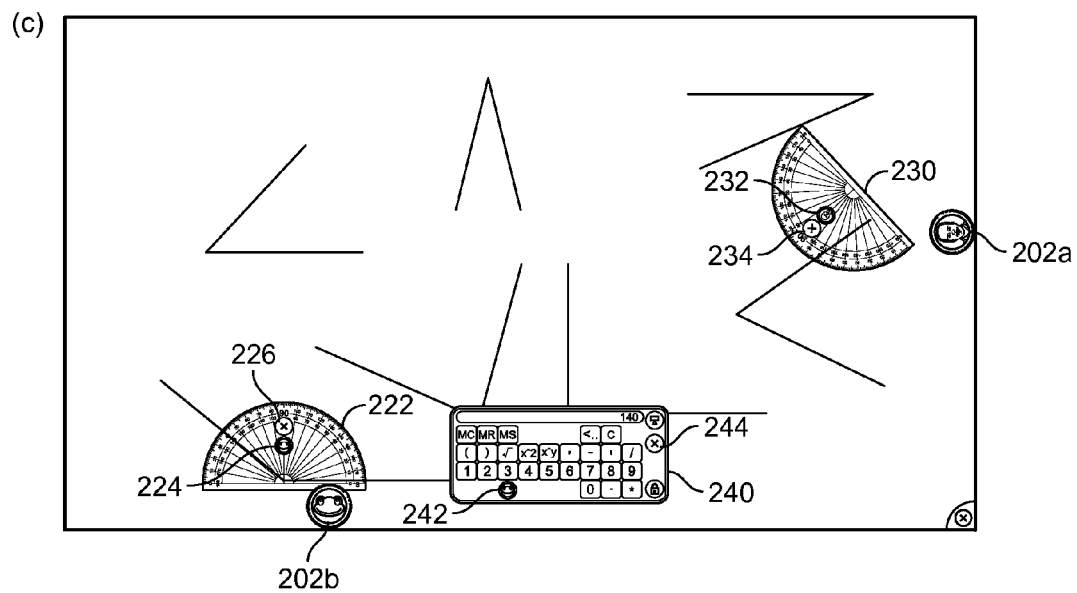
Figure 3:
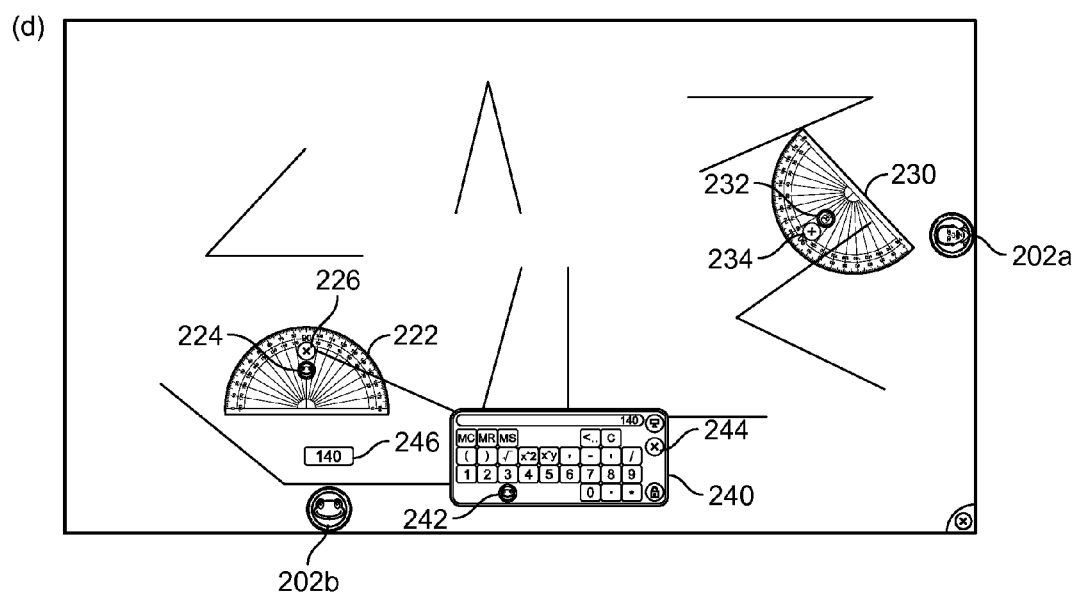
Figure 3:
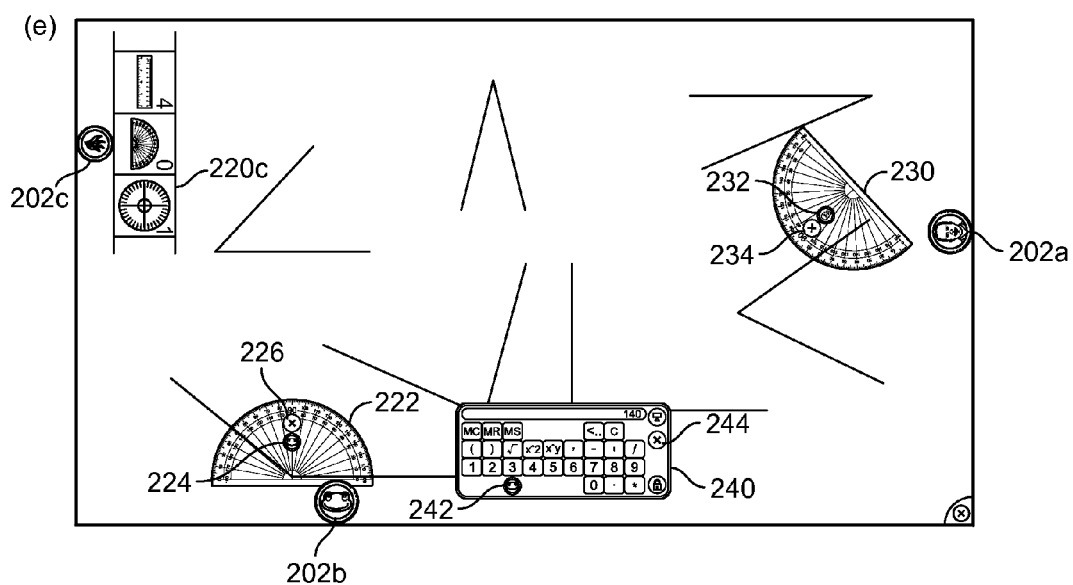

As illustrated in FIG. 3(a), at least some tools are displayed with a number. For example, referring to each of the tool menus 220a and 220b, a number "4" is displayed in conjunction with the ruler tool, and a number "2" is displayed in conjunction with the protractor tool. These numbers represent the number of tools that are available within the tool menu or library. When a tool is selected by any user, the number of available identical tools is reduced by one.

Preferably if no number is displayed with a tool then that means an unlimited number of that tool are available.

As illustrated in FIG. 3(b), the specific tool menu 220b is no longer displayed, as the user associated with the token 202b has selected a particular tool, and in particular has selected a protractor tool. Thus as illustrated in FIG. 3(b) a protractor 222 is displayed on the display surface, and preferably with the protractor is displayed a small icon representing the user who has selected it, which in this example is a copy of the token with the user's avatar as denoted by reference numeral 224. Also displayed on the protractor 222 is an icon 226, which indicates a means for the user to deselect the tool. As illustrated in FIG. 3(b), the second user associated with token 202a has not selected any tool, and therefore the user's tool menu 220a is still displayed.

Referring to the tool menu 220a, it can be seen that the number associated with the displayed protractor tool has been reduced to "1", in view of the fact that one of the 2 available protractor tools has been selected by another user.

As illustrated in FIG. 3(c), the user 202a has now selected a tool, and therefore the specific tool menu 220a is no longer displayed. The user 202a has similarly selected a protractor as represented by reference numeral 230. The protractor 230 displays a copy of the token 202a as illustrated by icon 232, and an icon 234 with which the protractor may be deselected.

As additionally illustrated in FIG. 3(c), the first user associated with token 202b has now additionally selected a keyboard 240, and the keyboard is similarly displayed with an icon 242 being a duplicate of the token 202b, and an icon 244 with which the keyboard may be deselected.

In accordance with the principles as described earlier and utilised in this exemplary arrangement, any inputs detected and associated with the protractor 222 or the keyboard 240 is associated with the user associated with the user icon 202b. Any inputs detected as associated with the protractor 230 are associated with the user associated with the token 202a.

In FIG. 3(d), there is illustrated an icon 246 displaying a number (the number 140). This represents the result of a calculation performed using the keyboard 240. The keyboard 240 may be simply a calculator. This displayed answer as denoted by reference numerals 246 may be dragged to provide a label to a calculated angle. The application can determine that the answer has been provided by the first user associated with the token 202b, as it has been calculated using the keyboard 240.

As illustrated in FIG. 3(e) if a third user 202c is registered at the surface, and opens a tools menu 220c, the number of available protractors is identified as "0", as the two protractors available for the application are both in use with other users.

Thus the invention preferably provides a shared set of tools or resources in a common tool or resource library. Each user (or input source) accessed the tools or resources in the common library through a user (or input source) specific menu. The user specific menu for each user display for that user tools from the common tool library. The tools or resources displayed in each user specific menu is dynamically adjusted in accordance with the selection/deselection of tools or resources in the common tool library by users.

The sub-set of common resources provided to a user in a user-specific menu, being selected from the shared set of common resources in the common tool or resource library, may be in dependence upon the user needs. For example, the sub-set of common resources provided may be determined in dependence on a specific action currently being undertaken by a user, or a specific application currently being used by a user. Thus if a user is manipulating geometric shapes, the resources made available to the user are those associated with manipulating and generating geometric shapes. In this way, the resources provided to a user are specific to the current use, and the resources made available or displayed to the user are limited to usable resources for the current use or application. This may be further understood by way of another example. If a user is editing an image, and such editing does not allow use of text, no tools or resources associated with text editing are displayed.

All examples and embodiments described herein may be combined in various combinations, and are not mutually exclusive.

The invention has been described herein by way of reference to particular examples and exemplary embodiments. One skilled in the art will appreciate that the invention is not limited to the details of the specific examples and exemplary embodiments set forth. Numerous other embodiments may be envisaged without departing from the scope of the invention, which is defined by the appended claims.

What is claimed is:

1. A method of providing resources in a collaborative input system comprising an interactive display surface, the method comprising:
   executing an application by a plurality of users of the interactive display surface, wherein at least two users of the plurality of users are simultaneously interacting with the collaborative input system;
   providing a single common menu to the at least two users interacting with the execution of said application, the single common menu identifying a plurality of items, including at least one item for which there is a predetermined number of identical resources available; and
   displaying on the interactive display surface a plurality of individual menus, each associated with one of the at least two users, wherein each individual menu:
      comprises icons representing the plurality of items of said single common menu, including an icon representing the at least one item,
      displays the icon representing the at least one item with a number, the number representing the number of identical resources available for that at least one item, and
      adjusts each display of the number of identical resources available for the at least one item upon selection of the icon representing the at least one item by one of the at least two users,
      wherein the displayed number of identical resources is decreased by one in each of the plurality of individual menus upon selection of the icon representing the at least one item by one of the at least two users, and the displayed number of identical resources is increased by one in each of the plurality of individual menus upon deselection of the icon representing the at least one item by one of the at least two users.

2. The method of claim 1 wherein the plurality of individual menus are provided to each user based on the single common menu in dependence upon the user needs.

3. The method of claim 1 further comprising displaying an icon representing the resource on the display, wherein if the resource is selected by a user an identification of that user is displayed with said icon.

4. The method of claim 2, wherein at least one of the plurality of individual user menus comprises a sub-set of the items of the single common menu.

5. A non-transitory computer-readable medium for storing computer program code which, when run on a computer, performs the method of claim 1.

6. A collaborative input system comprising an interactive display surface, and adapted to:
   execute an application by a plurality of users of the interactive display surface, wherein at least two users of the plurality of users are simultaneously interacting with the collaborative input system;
   provide a single common menu to the at least two users interacting with said application, the single common menu identifying a plurality of items, including at least one item for which there is a predetermined number of identical resources available; and
   display on the interactive display surface a plurality of individual menus, each associated with one of the at least two users, wherein each individual menu:
      comprises icons representing the plurality of items of said single common menu including an icon representing the at least one item,
      displays the icon representing the at least one item with a number, the number representing the number of identical resources available for the at least one item, and
      adjusts each display of the number of identical resources available for the at least one item upon selection of the icon representing the at least one item by one of the at least two users,
      wherein the displayed number of identical resources is decreased by one in each of the plurality of individual menus upon selection of the icon representing the at least one item by one of the at least two users, and the displayed number of identical resources is increased by one in each of the plurality of individual menus upon deselection of the icon representing the at least one item by one of the at least two users.

7. The collaborative input system of claim 6 wherein the plurality of individual menus are provided to each user based on the single common menu in dependence upon the user needs.

8. The collaborative input system of claim 7, wherein at least one of the plurality of individual user menus comprises a sub-set of the items of the single common menu.

9. The collaborative input system of claim 6 further adapted to display an icon representing the resource on the display, wherein if the resource is selected by a user an identification of that user is displayed with said icon.

10. A collaborative input system comprising an interactive display surface, and further comprising:
    means for executing an application by a plurality of users of the interactive display surface, wherein at least two users of the plurality of users are interacting with the collaborative input system simultaneously;
    means for providing a single common menu to the at least two users interacting with the execution of said application, the single common menu identifying a plurality of items, including at least one item for which there is a predetermined number of identical resources available; and
    means for displaying on the interactive display surface a plurality of individual menus, each associated with one of the at least two users, wherein each individual menu:
       comprises an icon representing the at least one item, including an icon representing the at least one item,
       displays the icon representing the at least one item with a number, the number representing the number of identical resources available for that at least one item, and
       adjusts each display of the number of identical resources available for the at least one item upon selection of the icon representing the at least one item by one of the at least two users,
       wherein the displayed number of identical resources is decreased by one in each of the plurality of individual menus upon selection of the icon representing the at least one item by one of the at least two users, and the number is increased by one in each of the plurality of individual menus upon deselection of the icon representing the at least one item by one of the at least two users.

11. The collaborative input system of claim 10 wherein the plurality of individual menus are provided to each user based on the single common menu in dependence upon the user needs.

12. The collaborative input system of claim 11 wherein the representation of the number of identical resources available for the at least one item is a number of identical resources available for the at least one item.

13. The collaborative input system of claim 10 further comprising means for displaying an icon representing the resource on the display, wherein if the resource is selected by a user an identification of that user is displayed with said icon.

14. The collaborative input system of claim 10, wherein at least one of the plurality of individual user menus comprises a sub-set of the items of the single common menu.

\* \* \* \* \*

UNITED STATES PATENT AND TRADEMARK OFFICE
CERTIFICATE OF CORRECTION

PATENT NO. : 9,842,311 B2  
APPLICATION NO. : 13/348923  
DATED : December 12, 2017  
INVENTOR(S) : Nigel Pearce Page 1 of 1

It is certified that error appears in the above-identified patent and that said Letters Patent is hereby corrected as shown below:

On the Title Page

Item (75), at the Inventor, replace the word "Lancanshire" with the word -- Lancashire --

In the Claims

At Claim 10, Column 10, Line 35, remove the words "the execution of"

At Claim 10, Column 10, Line 40, remove the words "on the interactive display surface"

At Claim 10, Column 10, Line 44, remove the words "including an icon representing the at least one item,"

At Claim 10, Column 10, Line 48, remove the words "and"

Signed and Sealed this  
Twentieth Day of November, 2018

Andrei Iancu  
*Director of the United States Patent and Trademark Office*